(12) United States Patent
Kim et al.

(10) Patent No.: US 9,600,130 B2
(45) Date of Patent: Mar. 21, 2017

(54) LIQUID CRYSTAL DISPLAY DEVICE AND METHOD OF DRIVING THE SAME

(71) Applicant: Samsung Display Co., Ltd., Yongin, Gyeonggi-Do (KR)

(72) Inventors: Jeong Young Kim, Gyeongsangbuk-do (KR); Myeong Eon Lee, Asan-si (KR)

(73) Assignee: Samsung Display Co., Ltd. (KR)

( * ) Notice: Subject to any disclaimer, the term of this patent is extended or adjusted under 35 U.S.C. 154(b) by 58 days.

(21) Appl. No.: 14/796,870

(22) Filed: Jul. 10, 2015

(65) Prior Publication Data
US 2016/0209950 A1    Jul. 21, 2016

(30) Foreign Application Priority Data

Jan. 15, 2015    (KR) .......................... 10-2015-0007624

(51) Int. Cl.
*G06F 3/041*    (2006.01)
*G06F 3/044*    (2006.01)

(52) U.S. Cl.
CPC .... *G06F 3/044* (2013.01); *G06F 2203/04111* (2013.01)

(58) Field of Classification Search
CPC ............................... G06F 3/044; G06F 3/0416
USPC .................................................. 345/173, 174
See application file for complete search history.

(56) References Cited

U.S. PATENT DOCUMENTS

| | | |
|---|---|---|
| 2008/0048994 A1 | 2/2008 | Lee et al. |
| 2011/0298745 A1 | 12/2011 | Souchkov |
| 2012/0162134 A1 | 6/2012 | Chen et al. |

FOREIGN PATENT DOCUMENTS

| | | |
|---|---|---|
| KR | 10-2013-0053060 | 5/2013 |
| KR | 10-2013-0065348 | 6/2013 |
| KR | 10-2013-0065355 | 6/2013 |

*Primary Examiner* — Calvin C Ma
(74) *Attorney, Agent, or Firm* — Innovation Counsel LLP

(57) ABSTRACT

Provided is a liquid crystal display device including: a plurality of pixel electrodes to which a display voltage is supplied; a common electrode forming first capacitance with the plurality of pixel electrodes, and having a common voltage supplied thereto; a plurality of sensing electrodes forming second capacitance with the common electrode, and having a touch driving signal supplied thereto; and a touch controller supplying the touch driving signal, wherein a voltage of the common electrode includes a first ripple component that is generated due to variation in the display voltage and a second ripple component that is generated due to variation in the touch driving signal, and the touch controller supplies the touch driving signal such that a polarity of the second ripple component is determined based on a polarity of the first ripple component.

18 Claims, 10 Drawing Sheets

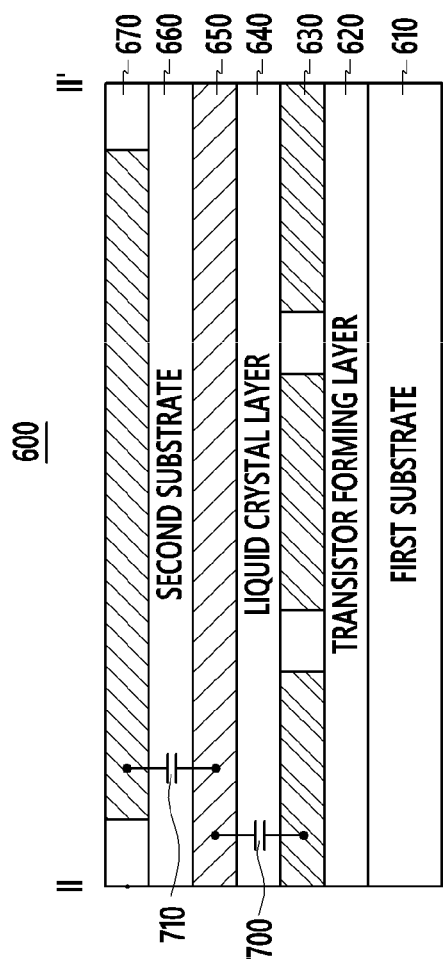

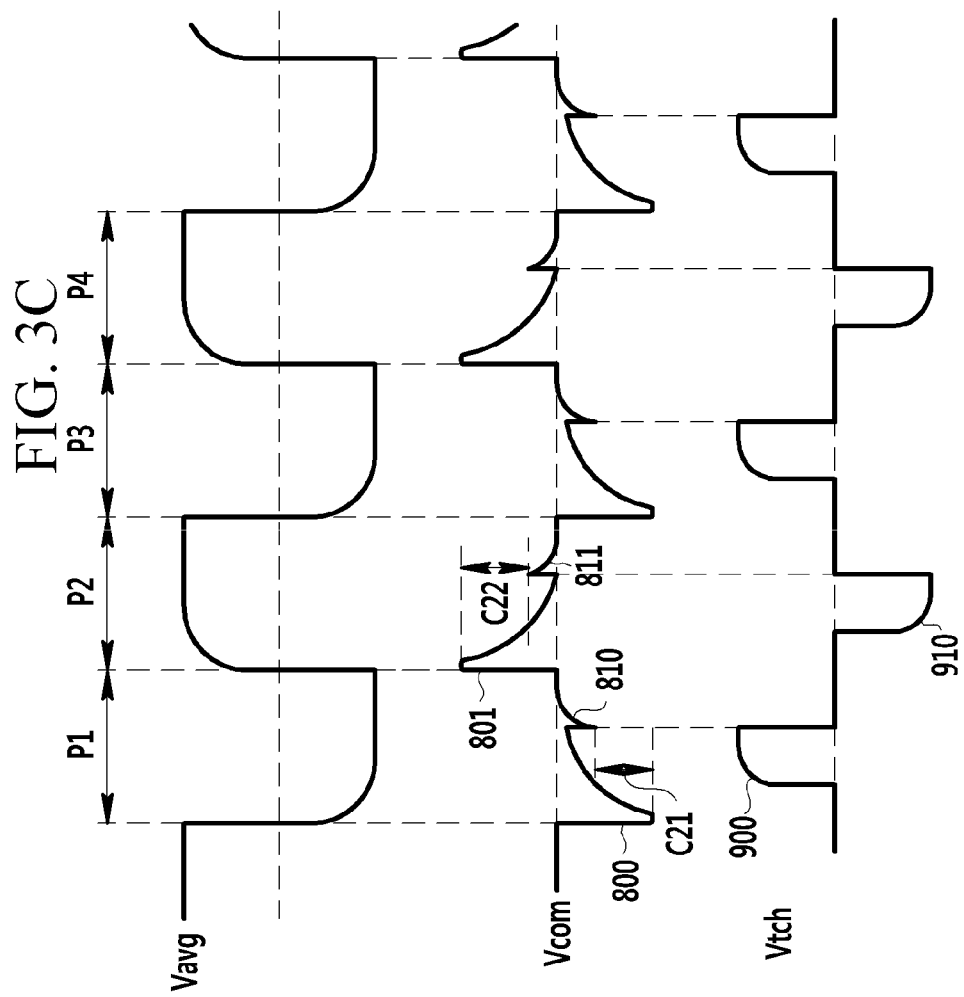

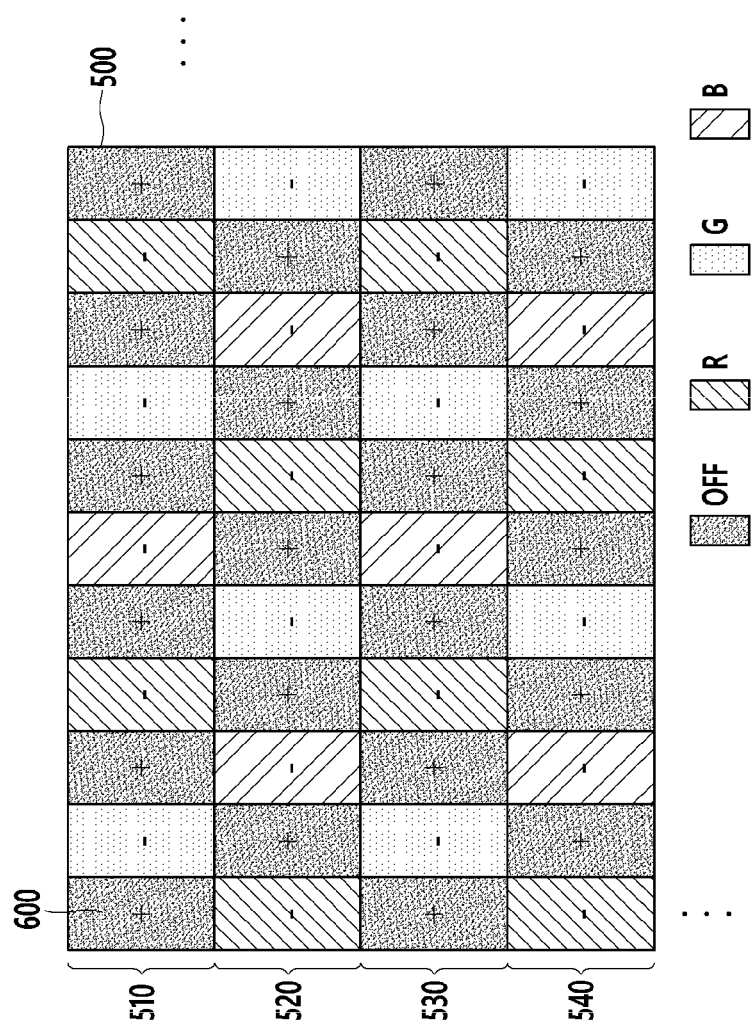

LIQUID CRYSTAL DISPLAY DEVICE AND METHOD OF DRIVING THE SAME

CROSS-REFERENCE TO RELATED APPLICATION

This application claims priority to and the benefit of Korean Patent Application No. 10-2015-0007624 filed in the Korean Intellectual Property Office on Jan. 15, 2015, the entire contents of which are incorporated herein by reference.

BACKGROUND (a) Field

The present inventive concept relates to a liquid crystal display device and a method of driving the same.

(b) Description of the Related Art

A liquid crystal display device, which is one of flat panel display devices that are currently used widely, includes a lower display panel, on which a plurality of pixel electrodes are formed, an upper display panel, on which a common electrode is formed, and a liquid crystal layer interposed between the two display panels, and a predetermined voltage is applied to the plurality of pixel electrodes and the common electrode to realign liquid crystal molecules of the liquid crystal layer to thereby adjust an amount of transmitted light.

According to a mode of the liquid crystal display device, a common electrode may be formed on a lower display panel in addition to a plurality of pixel electrodes so as to adjust alignment of liquid crystal molecules by using a fringe field.

The liquid crystal display device may be configured to sense a touch of a user by including a touch sensor.

A touch sensor may be classified, according to various methods, into a resistive type touch sensor, a capacitive type touch sensor, an electro-magnetic (EM) type touch sensor, an optical type touch sensor or the like.

In the liquid crystal display device, a touch screen panel (TSP) that is separate from a display panel may be formed and adhered to the display panel, or a TSP and a display panel may be integrally formed with each other.

Examples of an integral structure are an on-cell type structure and an in-cell type structure and the like.

According to development of the technology of display manufacture, display panels are becoming thin and a distance between a sensing electrode used to sense a touch of a user and other electrodes is shortened.

In particular, as a distance between a sensing electrode in a touch screen panel and a common electrode in a display panel is shortened, parasitic capacitance which is undesirable is formed between the two electrodes and affects voltages of the respective electrodes.

According to the conventional art, a voltage of a common electrode according to a mode of driving the display panel may affect a voltage of the sensing electrode, and problems may be caused in sensing a touch of a user.

However, in contrast, as a voltage of a touch driving signal supplied to the sensing electrode has been recently increased (e.g., a voltage of 8 V or higher), the voltage of the sensing electrode rather affects the voltage of the common electrode to affect screen display of a display device.

The above information disclosed in this Background section is only for enhancement of understanding of the background of the inventive concept and therefore it may contain information that does not form the prior art.

SUMMARY

The present inventive concept has been made in an effort to provide a liquid crystal display device in which a touch driving signal does not affect screen display of the display device even on a thin display panel, and a method of driving the liquid crystal display device.

An exemplary embodiment of the present inventive concept provides a liquid crystal display device including: a plurality of pixel electrodes to which a display voltage is supplied; a common electrode forming first capacitance with the plurality of pixel electrode, and having a common voltage supplied thereto; a plurality of sensing electrodes forming second capacitance with the common electrode, and having a touch driving signal supplied thereto; and; a touch controller supplying the touch driving signal, wherein a voltage of the common electrode includes a first ripple component that is generated due to variation in the display voltage and a second ripple component that is generated due to variation in the touch driving signal, and, the touch controller supplies the touch driving signal such that a polarity of the second ripple component is determined based on a polarity of the first ripple component.

The first ripple component and the second ripple component may overlap to form a third ripple component.

The touch controller may determine a polarity of the touch driving signal in a direction in which a size of each of the third ripple component is reduced.

The first ripple component and the second ripple component may have opposite polarities from each other.

The touch controller may supply a touch driving signal such that a polarity of the first ripple component and a polarity of the second ripple component adjacent to the first ripple component are the same.

The touch controller may receive a touch sensing signal from the plurality of sensing electrode, and the touch sensing signal may include a fourth ripple component according to the second capacitance, and the touch controller may derive a polarity of the first ripple component from a polarity of the fourth ripple component.

The liquid crystal display device may further include: a data driver supplying a data voltage corresponding to the display voltage; a timing controller supplying image data and a first control signal to the data driver and supplying a second control signal to the touch controller; and a pattern detecting unit determining whether the image data pattern corresponds to one of a plurality of correction-target patterns, wherein if the image data pattern corresponds to one of the plurality of correction-target patterns, the timing controller supplies the second control signal such that the touch controller supplies the touch driving signal corresponding to the correction-target pattern.

The pattern detecting unit may be integrally formed with the timing controller.

The liquid crystal display device may further include a data driver supplying a data voltage corresponding to the display voltage, wherein the touch driving signal from the touch controller synchronizes with the data voltage.

The touch controller may receive a synchronization signal from the data driver.

The liquid crystal display device may further include: a timing controller supplying image data and a first control signal to the data driver and supplying a second control signal to the touch controller, wherein the second control signal is a synchronization signal corresponding to the supply period of the data voltage.

The second ripple component is generated to correspond to a second edge that follows a first edge in a pulse of the touch driving signal.

The touch driving signal may be supplied such that the distortion amount, which is a sum of the first ripple component and the second ripple component, is identical for the each predetermined period.

Yet another embodiment of the present inventive concept provides a method of driving a liquid crystal display device including: a plurality of pixel electrodes, a common electrode forming first capacitance with the plurality of pixel electrodes, and a plurality of sensing electrodes forming second capacitance with the common electrode, the method including: sensing a voltage of the common electrode, including a first ripple component derived from the first capacitance; and supplying a touch driving signal to the plurality of sensing electrodes such that the voltage of the common electrode includes a second ripple component derived from the second capacitance, wherein a polarity of the second ripple component is determined based on a polarity of the first ripple component.

The first ripple component and the second ripple component may form a third ripple component.

The first ripple component and the second ripple component may have opposite polarities from each other.

A touch sensing signal received from the plurality of sensing electrodes may include a fourth ripple component according to the second capacitance, and the sensing of a voltage of the common electrode may further include deriving a polarity of the first ripple component from a polarity of the fourth ripple component.

In the sensing of the voltage of the common electrode, the voltage of the common electrode is indirectly sensed by determining which one of a plurality of correction-target patterns corresponds to an image data pattern corresponding to a display voltage supplied to the plurality of pixel electrodes.

According to an exemplary embodiment of the present inventive concept, a liquid crystal display device in which a touch driving signal does not affect screen display of the display device even on a thin display panel, and a method of driving the liquid crystal display device may be provided.

BRIEF DESCRIPTION OF THE DRAWINGS

FIG. 2 illustrates a stacked structure of a display panel according to an exemplary embodiment;

FIGS. 3A, 3B, 3C, 3D and 3E are a diagram for explaining a touch driving signal that is corrected when an image data pattern is a Sub-Vstripe pattern; and FIGS. 4A, 4B and 4C illustrate examples of a plurality of correction-target patterns besides a Sub-Vstripe pattern.

DETAILED DESCRIPTION OF THE EMBODIMENTS

Figure 1:
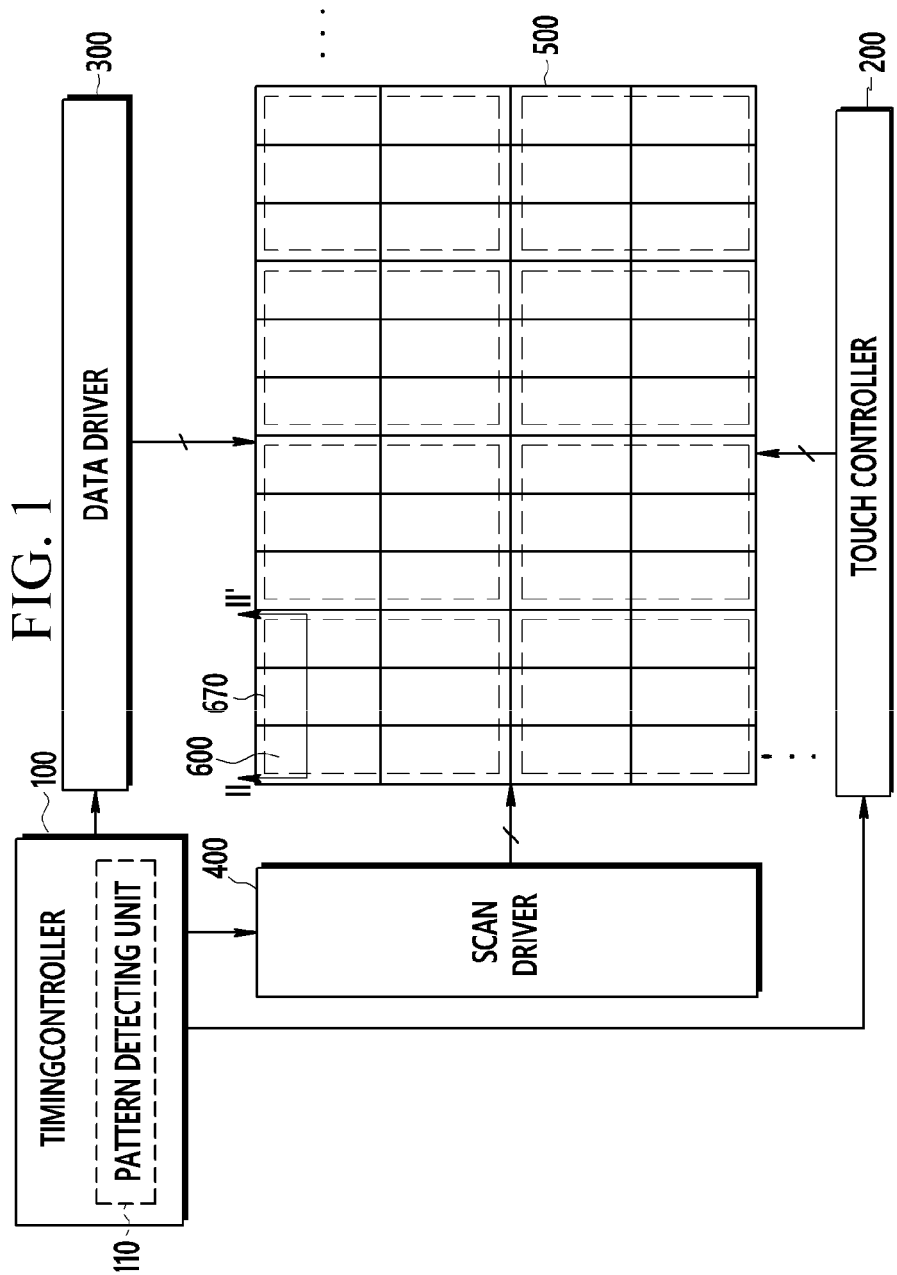
FIG. 1 illustrates a structure of a liquid crystal display device according to an exemplary embodiment of the present inventive concept.

Hereinafter, an exemplary embodiment of the present inventive concept will be described in detail with reference to the accompanying drawings.

In the description of the present inventive concept, the detailed description of known techniques which might unnecessarily obscure the subject matter of the present inventive concept will be omitted or made in brief.

Also, it should be noted that like reference numerals denote like elements throughout the specification.

Hereinafter, preferred embodiments of the present inventive concept will now be described with reference to the attached drawings. The meaning of the terms used in the present specification and claims of the present inventive concept should not be limited to be of ordinary or literary meaning but construed as meanings and concepts not departing from the spirit and scope of the inventive concept based on the principle that the inventor is capable of defining concepts of terms in order to describe his or her inventive concept in the most appropriate way.

Accordingly, the features disclosed in the preferred embodiments and drawings of the present specification are examples of embodiments of the present inventive concept, and thus it should be understood that there are alternative equivalents or variation examples that can replace the embodiments at the point of the filing of the present application.

It will be understood that, although the terms first, second, etc. may be used herein to describe various elements, these terms are only used to distinguish one element from another, and these elements should not be limited by these terms.

FIG. 1 illustrates a structure of a liquid crystal display device according to an exemplary embodiment of the present inventive concept.

Referring to FIG. 1, the liquid crystal display device according to an exemplary embodiment of the present inventive concept includes a timing controller 100, a touch controller 200, a data driver 300, a scan driver 400, and a display panel 500.

The elements are respectively functionally classified and may each be manufactured as an individual integrated circuit (IC) or the entire elements may be in a single IC. The configuration may vary according to design of display panels of the manufacturer.

The timing controller 100 may receive from an external host system a timing signal such as a vertical synchronization signal Vsync, a horizontal synchronization signal Hsync, a data enable signal DE, a clock signal CLK, or the like and video data.

According to the timing signal and the video data, the timing controller 100 may generate a first control signal and image data and supply the same to the data driver 300, and supply a second control signal to the touch controller 200, and a third control signal to the scan driver 400.

The first control signal may include a source start pulse SSP indicating a start point of one horizontal period 1H, a source sampling clock SSC controlling a latch operation of data based on a rising edge or a falling edge, a source output enable signal SOE controlling an output of the data driver 300, a polarity control signal POL controlling a polarity of a data voltage, or the like.

The second control signal may include a synchronization signal controlling a supply timing of a touch driving signal supplied by the touch controller 200, a polarity control signal POL2 controlling a polarity of a touch driving signal Vtch, or the like. The synchronization signals may correspond to the vertical synchronization signal Vsync or the horizontal synchronization signal Hsync, or may be separated from one another at predetermined intervals in order to avoid display noise.

The third control signal may include a gate start pulse GSP indicating a start of each horizontal period constituting a first vertical period in which a display frame is displayed, a gate shift clock signal GSC that is input to a shift register in the scan driver 400 to sequentially shift the gate start pulse GSP, a gate output enable signal GOE controlling an output of the scan driver 400, or the like.

The touch controller 200 supplies a touch driving signal Vtch to the plurality of sensing electrodes 670 according to the second control signal. The touch controller 200 may determine a supply timing of the touch driving signal Vtch according to the second control signal, or change a polarity of the touch driving signal Vtch.

According to another exemplary embodiment, the touch controller 200 may be configured to be connected to the data driver 300 via a signal line to receive a synchronization signal corresponding to a supply period of a data voltage from the data driver 300 and determine a supply timing of the touch driving signal Vtch. Also, the touch controller 200 may be configured to receive a polarity control signal POL3 corresponding to a polarity of the data voltage from the data driver 300 to control a polarity of the touch driving signal Vtch.

If a touch sensing method is a mutual capacitance method, and the plurality of sensing electrodes 670 are formed by alternately arranging transmit electrodes, Tx electrodes, and receive electrodes, Rx electrodes, the touch controller 200 may include a Tx driving circuit and an Rx driving circuit. A touch driving signal Vtch may be supplied to the Tx electrodes, and the Rx driving circuit may sample a sensing voltage from the Rx electrodes to thereby detect a touch of a user.

If a touch sensing method is a self-capacitance method, the sensing electrodes 670 may not be divided into Tx electrodes and Rx electrodes, but a touch driving signal Vtch may be supplied to all of the sensing electrodes 670. The touch controller 200 may sample a touch voltage via a read-out circuit to detect a touch of a user.

The data driver 300 generates a data voltage by converting the data voltage to a positively polarized/negatively polarized analog gamma compensation voltage according to the first control signal and the image data, and supplies the data voltage to each of pixels 600 on the display panel 500 via a plurality of data lines.

The scan driver 400 sequentially supplies a scan pulse synchronized with the data voltage to pixel rows on the display panel 500 via a plurality of scan lines according to the third control signal.

The display panel 500 includes a plurality of data lines extending in a vertical direction and a plurality of scan lines extending in a horizontal direction to define pixel rows, and a plurality of pixels 600, positions of which are defined by the data lines and the scan lines.

The plurality of sensing electrodes 670 formed in an on-cell manner are formed on the pixels 600. While the plurality of sensing electrodes 670 having a size corresponding to six pixels 600 are formed when referring to FIG. 1, relative sizes of the respective electrodes are not limited thereto. The sizes of the sensing electrodes 670 may be differently designed according to a driving signal line, touch precision, or the like.

A plurality of correction-target patterns are stored in the pattern detecting unit 110 in advance. A correction-target pattern is an image data pattern which can cause an abnormal display such as moiré if a touch driving signal Vtch is supplied without being corrected.

In FIG. 3, a Sub-Vstripe pattern is illustrated as an example of the image data pattern. In addition, patterns such as a Sub-dot pattern (FIG. 4A), a Sub-2dot pattern (FIG. 4B), a 1dot pattern (FIG. 4C) or the like may correspond to a plurality of correction-target patterns.

The pattern detecting unit 110 in the timing controller 100 determines whether the image data pattern corresponds to one of the plurality of correction-target patterns.

According to a detection signal from the pattern detecting unit 110, the timing controller 100 may change a synchronization signal included in the second control signal supplied to the touch controller 200 to change a cycle and a polarity of the touch driving signal Vtch. Alternatively, the timing controller 100 may appoint a pattern of a touch driving signal Vtch to be supplied and inform the touch controller 200 of the pattern.

The pattern detecting unit 110 may be integrally formed with the timing controller 100.

The pattern detecting unit 110 is an optional element, and may be omitted in the liquid crystal display device according to the exemplary embodiment of the present inventive concept.

If the pattern detecting unit 110 is omitted, an image data pattern may be determined using an analog method. This will be described in more detail with reference to FIG. 2.

FIG. 2 illustrates a stacked structure of a display panel according to an exemplary embodiment.

FIG. 2 is a cross-sectional view of a portion of the liquid crystal display device taken along a line II-IF of FIG. 1.

Referring to FIG. 2, on the display panel 500 according to the exemplary embodiment, a first substrate 610, a transistor forming layer 620, a plurality of pixel electrodes 630, a liquid crystal layer 640, a common electrode 650, a second substrate 660, and a sensing electrode 670 are sequentially stacked.

The stacked structure described above may be varied according to a mode of the liquid crystal display device.

In the above stacked structure, another layer may be interposed between respective layers. Each of electrodes to be described below may be formed of a transparent electrode such as indium tin oxide (ITO).

The first substrate 610 may be formed of glass or a plastic material such as polyimide or the like.

In the transistor forming layer 620, a scan line may be disposed as a lowermost layer, and a gate insulation layer, a semiconductor layer, and an insulation layer may be sequentially stacked, and also, source and drain electrodes that form a transistor and a data electrode layer where a data line is formed may be included. Also, the transistor forming layer 620 may include other insulation layers, a color filter, a black matrix, or the like.

The plurality of pixel electrodes 630 are electrically connected to an electrode of the transistor through a contact hole, and may include an alignment layer in a portion where the pixel electrodes 630 contact the liquid crystal layer 640.

The liquid crystal layer 640 may include a plurality of liquid crystal molecules, which are either a negative type or a positive type according to a structure and a mode of the liquid crystal display device.

The common electrode 650 may be formed to have a plate shape and receive a common voltage Vcom.

The common voltage Vcom may be a constant voltage and correspond to a ground voltage GND.

The common electrode 650 may include an alignment layer formed in a surface contacting the liquid crystal layer 640.

The second substrate 660 may face the first substrate 610 to encapsulate the liquid crystal layer 640 by using a seal.

According to the structure of the liquid crystal display device, the second substrate 660 may be omitted. The second substrate 660 may be replaced by an insulation layer to insulate the common electrode 650 and the plurality of sensing electrodes 670 from each other. If a color filter and a black matrix are not formed on the first substrate 610, the second substrate 660 may be configured to include a color filter and a black matrix.

The plurality of sensing electrodes 670 may be formed on the second substrate 660 in a matrix configuration. While the plurality of sensing electrodes 670 are formed on the second substrate 660 in an on-cell manner in FIG. 2, the plurality of sensing electrodes 670 may also be formed in the transistor forming layer 620 in an in-cell manner. Also, a touch screen panel (TSP) may be additionally manufactured on a separate substrate.

As described above, the plurality of sensing electrodes 670 may have different structures according to whether a touching sensing method is a mutual capacitance method or a self-capacitance method. According to the self-capacitance method, the plurality of sensing electrodes 670 may be intentionally formed to form capacitance with the common electrode 650.

The plurality of pixel electrodes 630 and the common electrode 650 form first capacitance 700.

The plurality of sensing electrodes 670 and the common electrode 650 may form second capacitance 710 intentionally as described above, or may unintentionally form second capacitance 710 during the manufacture of a thin display panel.

The first capacitance 700 and the second capacitance 710 may be electrically serially connected to each other to form third capacitance.

If the pattern detecting unit 110 is omitted, an image data pattern may be indirectly detected as follows.

First, the touch controller 200 receives a touch sensing signal from the plurality of sensing electrodes 670. The touch sensing signal may include a fourth ripple component according to the second capacitance 710.

Consequently, variation in an average display voltage Vavg is expressed as the fourth ripple component of the touch sensing signal via the first capacitance 700 and the second capacitance 710.

According to the conventional art, the fourth ripple component functions as a noise component (display noise) when sensing a touch of a user. However, a voltage of a touch driving signal Vtch is sufficiently high according to the present inventive concept, and thus, the fourth ripple component may be used as information.

A cycle and a polarity of first ripple components 800 and 801 may be derived from a cycle and a polarity of the fourth ripple component. If the cycle and the polarity of the first ripple components 800 and 801 are known, an image data pattern may be indirectly derived using the cycle and the polarity of the first ripple components 800 and 801.

It will be obvious to one of ordinary skill in the art in more detail that the first ripple components 800 and 801 and an image data pattern correspond to each other in view of description of an exemplary embodiment of FIG. 3.

FIG. 3 is a diagram for explaining a touch driving signal that is corrected when an image data pattern is a Sub-Vstripe pattern.

Figure 3A:
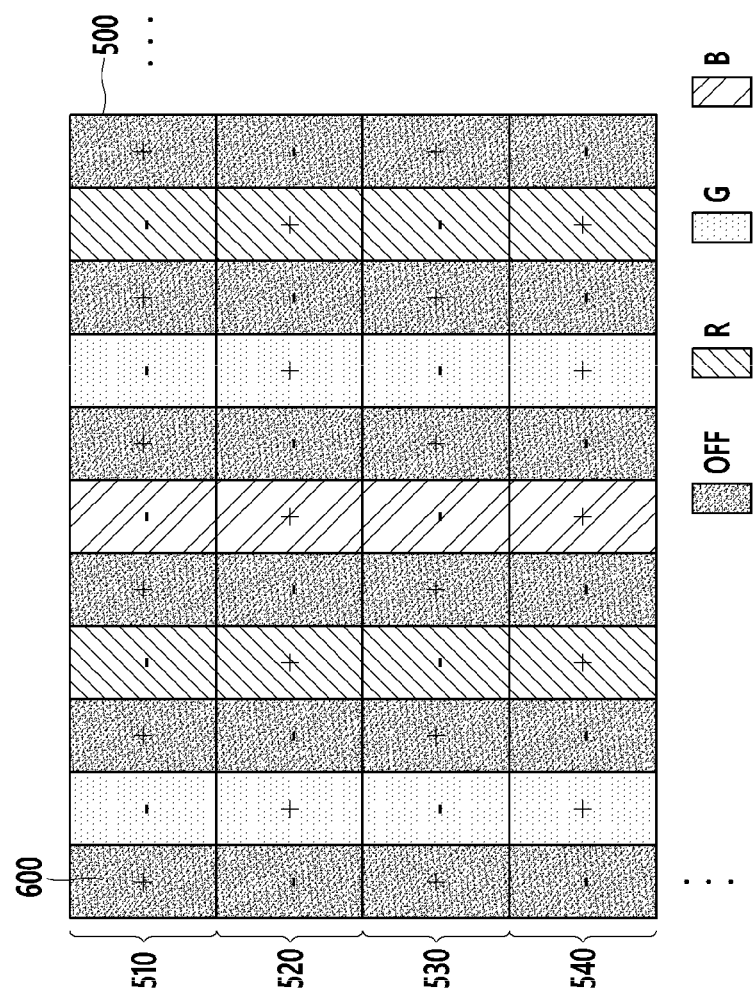
Figure 4B:
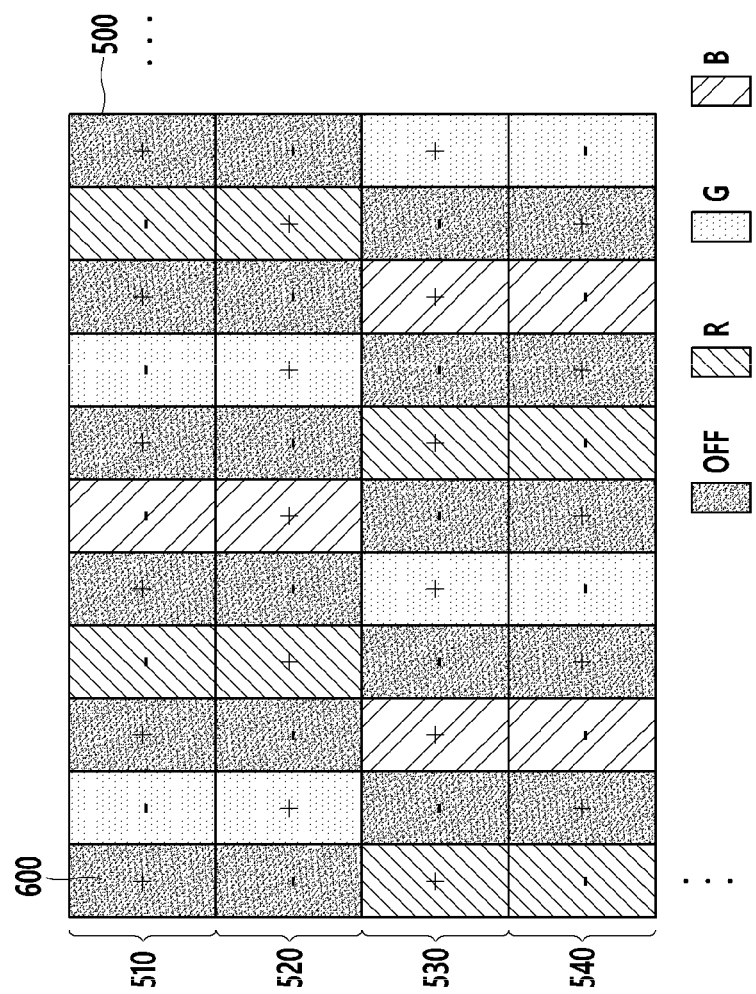
Figure 4C:
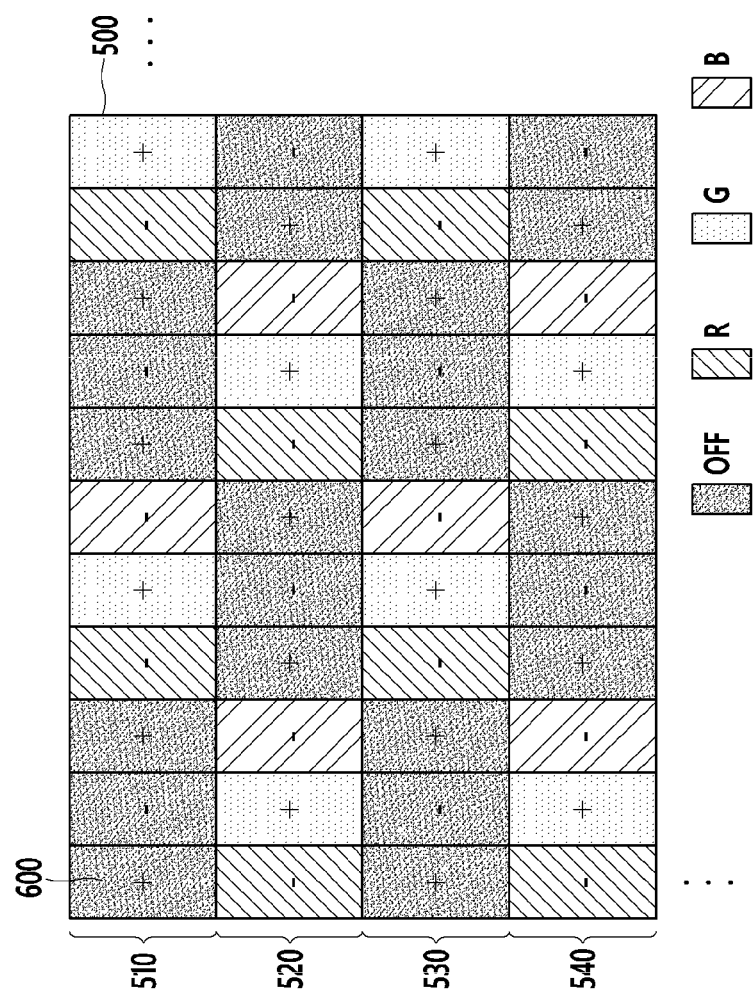

FIG. 3A illustrates an image data pattern that is a Sub-Vstripe pattern when the liquid crystal display device uses a Z-inversion driving method.

The term 'Sub' is used in that an R pixel, a G pixel, and a B pixel which are in a series do not form one single dot. 'Vstripe' denotes a vertically striped pattern.

An off pixel OFF is viewed as black to a user, and is a pixel to which no sufficient amount of display voltage is applied in a normally black mode.

In FIG. 3A and also in FIG. 4 below, an R pixel, a G pixel, and a B pixel respectively refer to a red pixel, a green pixel, and a blue pixel that are turned on when a sufficient amount of display voltage is applied thereto.

According to the exemplary embodiment of the present inventive concept, a Sub-Vstripe pattern may correspond to a correction-target pattern.

According to the present exemplary embodiment, it will be described that the liquid crystal display device uses a Z-inversion driving method for convenience of description.

The Z-inversion driving method is one driving method used to prevent deterioration of the liquid crystal layer 640 which may occur if a one-directional electrical field is continuously applied to the liquid crystal layer 640.

According to the Z-inversion driving method, a data line to which a negatively polarized data voltage is applied and a data line to which a positively polarized data voltage is applied are alternately arranged with respect to the common voltage Vcom, and the pixels 600 are electrically connected to the respective data lines in a zigzag direction so that the pixels 600 have electrical field directions of a different polarity from other pixels adjacent in horizontal and vertical directions and that a swing range of the data voltage is reduced at the same time to minimize power consumption.

The Z-inversion driving method is an exemplary embodiment, and the present inventive concept is not limited to the Z-inversion driving method. Whatever driving method is used, it will be obvious to one of ordinary skill in the art that an average display voltage Vavg according to an image data pattern may be derived. The average display voltage Vavg will be described below again.

Each pixel row is sequentially selected according to a scan pulse supplied for each one horizontal period 1H by the scan driver 400 to receive a data voltage. Referring to FIG. 3A, a data voltage is supplied to pixels of a pixel row 510 in a period P1, to pixels of a pixel row 520 in a period P2, to pixels of a pixel row 530 in a period P3, and to pixels of a pixel row 540 in a period P4. An order in which pixel rows are selected may be varied according to a display method.

Figure 3B:
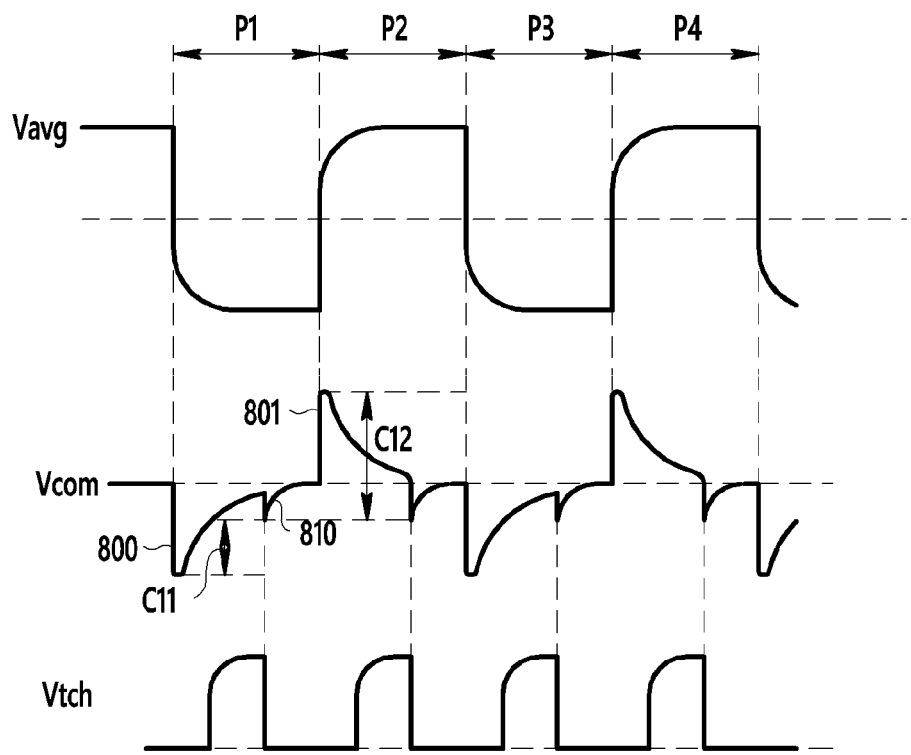

Referring to FIG. 3B, an average display voltage Vavg according to a driving period of the liquid crystal display device, a common voltage Vcom which is a voltage of the common electrode 650, and a touch driving signal Vtch are illustrated.

The average display voltage Vavg refers to an average of a plurality of display voltages applied to the pixel electrodes 630 of the plurality of pixels 600 that form a pixel row driven in each one horizontal period.

As described above, a scan pulse is applied by the scan driver 400 to a scan line corresponding to a pixel row per one horizontal period. The plurality of pixels 600 that form the pixel row receive a data voltage from a data line. The applied data voltage allows a display voltage corresponding to the data voltage to be applied to the pixel electrodes 630 that form the pixel 600 by an operation of an internal transistor.

According to a structure of the liquid crystal display device, a data voltage may be the same or substantially the same as a display voltage.

According to the present inventive concept, a sum of respective display voltages applied to the pixel electrodes 630 of a pixel row, divided by the number of pixels that form each pixel row, is referred to as an average display voltage Vavg.

Referring to FIGS. 3A and 3B, the average display voltage Vavg is a negatively polarized voltage in a first pixel row during the period P1, and a positively polarized voltage in a second pixel row during the period P2, a negatively polarized voltage in a third pixel row during the period P3, and a positively polarized voltage in a fourth pixel row during the period P4.

Referring to FIG. 3A, a simple image data pattern is described as an example (where display voltages having one polarity are applied to one pixel row), and the average display voltage Vavg may be intuitively derived as described above.

However, even when a negative display voltage and a positive display voltage are applied to a pixel row, if an average of all display voltages applied during one horizontal period is a negative value, the average display voltage Vavg is referred to as negatively polarized, and if the average is a positive value, the average display voltage Vavg may be referred to as positively polarized.

A touch driving signal Vtch may be supplied to the Tx electrodes of the plurality of sensing electrodes 670 in the mutual capacitance method and to all of the sensing electrodes 670 in the self-capacitance method, as described above.

In order to reduce power consumption, a touch driving signal Vtch may be supplied in an interlaced manner, or while being supplied in a predetermined group unit, if a touch is detected from the group, a touch driving signal Vtch for detecting minute coordinates may be resupplied only to a corresponding group.

In FIG. 3B, a touch driving signal Vtch is supplied in the form of a positively polarized pulse in units of one horizontal period 1H.

According to another embodiment, a touch driving signal Vtch may be supplied in the form of a negatively polarized pulse or touch driving signals Vtch with alternating polarities, that is, a touch driving signal Vtch having a positive polarity and a touch driving signal Vtch having a negative polarity may be alternately supplied. This will be described in detail with reference to FIG. 3C.

Also, a touch driving signal Vtch may be supplied two times or more in a one horizontal period 1H, or once in two or more horizontal periods. Alternatively, according to methods, a touch driving signal Vtch may not be synchronized with a horizontal period. Here, a touch driving signal Vtch may be synchronized with a vertical period that corresponds to a display frame report period. According to methods, a touch driving signal Vtch may not be synchronized with any one of a horizontal period and a vertical period.

In FIG. 3B and subsequent drawings, a dotted line in a horizontal direction in graphs of the average display voltage Vavg and the touch driving signal Vtch denotes an ideal common voltage Vcom. Alternatively, the dotted line in a horizontal direction may denote a predetermined reference voltage Vref.

According to the present exemplary embodiment, the ideal common voltage Vcom denotes a constant DC voltage. The DC voltage may be a ground voltage GND. According to a configuration of the liquid crystal display device, a common voltage may be in the form of a square wave.

The common voltage Vcom of FIG. 3B is a constant DC voltage and is supplied to the common electrode 650, but as the common electrode 650 is electrically connected to the first capacitance 700, a voltage of the common electrode 650 includes first ripple components 800 and 801 due to variation in a display voltage.

Hereinafter, description will be based on not each display voltage but the above-described average display voltage Vavg.

The average display voltage Vavg has a falling edge at a starting point of the period P1. Here, the common voltage Vcom includes a first ripple component 800 which is negatively polarized, due to the first capacitance 700.

The average display voltage Vavg has a rising edge at an end point of the period P1 and at a starting point of the period P2.

The common voltage Vcom includes the first ripple component 801 which is positively polarized, due to the first capacitance 700.

As described above, the common voltage Vcom includes the first ripple component 800 which is positively polarized or the first ripple component 801 which is negatively polarized, according to variation in the average display voltage Vavg also in other periods, and description thereof will be omitted below.

As described above, a touch driving signal Vtch is supplied in the form of a positively polarized pulse once at every one horizontal period 1H, and at a point when the touch driving signal Vtch has a falling edge, the common voltage Vcom has a second ripple component 810 which is negatively polarized, due to the second capacitance 710.

Although not illustrated in FIG. 3B, according to a configuration of the liquid crystal display device, the common voltage Vcom may include a second ripple component which is positively polarized, at point when the touch driving signal Vtch has a rising edge.

As a result, the common voltage Vcom may be distorted in each of the periods P1, P2, P3, and P4. According to the distortion amount, the liquid crystal display device may provide an undesirable image to the user.

Particularly, if a variation of the distortion amount per unit time is great, an abnormal image may be displayed on a liquid crystal display device, and if a variation of the distortion amount per unit time is small, a normal image may be displayed on a liquid crystal display device.

According to the present inventive concept, the distortion amount may be defined as a sum of the first ripple components 800 and 801 and the second ripple component 810 per a predetermined period.

Referring to FIG. 3B, the common voltage Vcom includes the first ripple component 800 which is negatively polarized and the second ripple component 810 which is negatively polarized, in the period P1, and includes the first ripple component 801 which is positively polarized and the second ripple component 810 which is negatively polarized, in the period P2.

Accordingly, an instantaneous Vcom variation C11 of the distortion amount in the period P1 is different from an instantaneous Vcom variation C12 of the distortion amount in the period P2, and an abnormal image may be displayed on a liquid crystal display device.

FIG. 3C illustrates that a polarity of a touch driving signal Vtch is compensated.

According to the present exemplary embodiment, the touch controller 200 may configure a touch driving signal Vtch by alternately providing a positively polarized pulse 900 and a negatively polarized pulse 910 to the plurality of sensing electrodes 670.

The touch controller 200 may directly recognize a cycle and a polarity of the first ripple components 800 and 801 based on the configuration of the liquid crystal display device including the pattern detecting unit 110.

Also, the touch controller 200 may indirectly recognize a cycle and a polarity of the first ripple components 800 and 801 from the fourth ripple component resulting from the first and second capacitances 700 and 710 if the liquid crystal display device does not include the pattern detecting unit 110.

Accordingly, the touch controller 200 may supply a touch driving signal Vtch such that polarities of the second ripple component 810 and 811 are determined based on the polarities of the first ripple components 800 and 801.

According to the present exemplary embodiment, the touch controller 200 supplies a touch driving signal Vtch such that the polarities of the first ripple components 800 and 801 and the polarities of the second ripple components 810 and 811 adjacent to the first ripple components 800 and 801 are the same.

Referring to FIG. 3C, a touch driving signal Vtch is supplied such that the second ripple component 810 adjacent to the negatively polarized first ripple component 800 is negatively polarized. Also, the touch driving signal Vtch is supplied such that the second ripple component 811 adjacent to the positively polarized first ripple component 801 is positively polarized.

The negatively polarized second ripple component 810 may be generated at a falling edge of the positively polarized pulse 900. The positively polarized second ripple component 811 may be generated at a rising edge of the negatively polarized pulse 910. The second ripple components 810 and 811 are generated to correspond to a second edge that follows a first edge in a pulse of the touch driving signal Vtch.

If a sum of the first ripple components 800 and 801 and the second ripple components 810 and 811 for each predetermined period is referred to as a distortion amount, a touch driving signal Vtch may be supplied such that the distortion amount is identical for each predetermined period. Referring to FIG. 3C, polarities of the total distortion amount are alternated in the respective periods P1, P2, P3, and P4, but the distortion amounts are identical. Thus, the average distortion amount converges on an ideal DC voltage, normal images may be displayed on a liquid crystal display device even though distortion actually exists.

Also, a variation C21 of the distortion amount in the period P1 and a variation C22 of the distortion amount in the period P2 are substantially the same, which is desirable as described above.

Figure 3D:
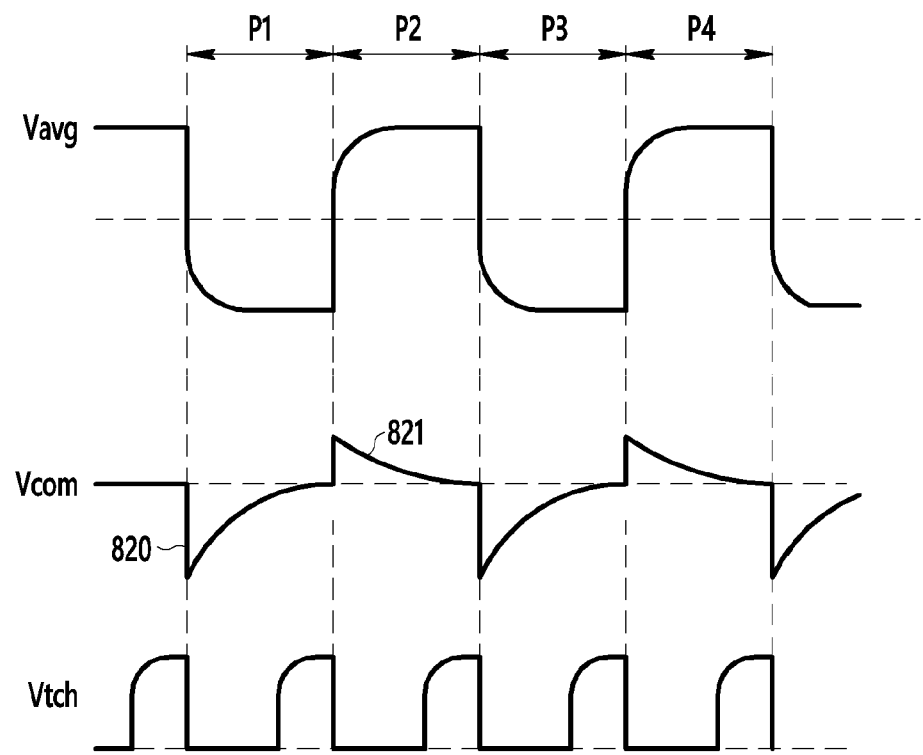

FIG. 3D is a diagram for explaining third ripple components 820 and 821.

In the exemplary embodiment of FIG. 3D, the touch controller 200 may directly receive a synchronization signal corresponding to a supply period of a data voltage, from the data driver 300. In this case, a process of deriving a first ripple component based on the configuration of the pattern detecting unit 110 and a fourth ripple component may not be necessary. The touch controller 200 may supply a touch driving signal Vtch in synchronization with the received synchronization signal. Alternatively, a second control signal supplied from the timing controller 100 to the touch controller 200 may include a synchronization signal corresponding to a supply period of a data voltage.

At a starting point of the period P1, the average display voltage Vavg has a falling edge, and the touch driving signal Vtch also has a falling edge. At the same time, a negatively polarized first ripple component and a negatively polarized second ripple component are overlapped to generate a negatively polarized third ripple component 820.

At a starting point of the period P2, the average display voltage Vavg has a rising edge, and the touch driving signal Vtch has a falling edge. At the same time, a positively polarized first ripple component and a negatively polarized second ripple component are overlapped to generate a positively polarized third ripple component 821.

FIG. 3D illustrates the third ripple component 821 when the influence of the average display voltage Vavg is sufficiently greater than the influence of the touch driving signal Vtch. The third ripple component 821 may be negatively polarized according to a degree of the influence of a falling edge of the touch driving signal Vtch. Also, the third ripple component 821 may have a positive polarity and a negative polarity in an alternating manner.

The second ripple components 810 and 811 do not occur in the middle of each of the periods P1, P2, P3, and P4 in FIG. 3D, and thus, a cycle of the distortion becomes the same as that of the one horizontal period. The variation cycle of the distortion is relatively longer than that of the exemplary embodiment of FIG. 3C, and therefore, an image may be recognized as a desirable display to the user.

Figure 3E:
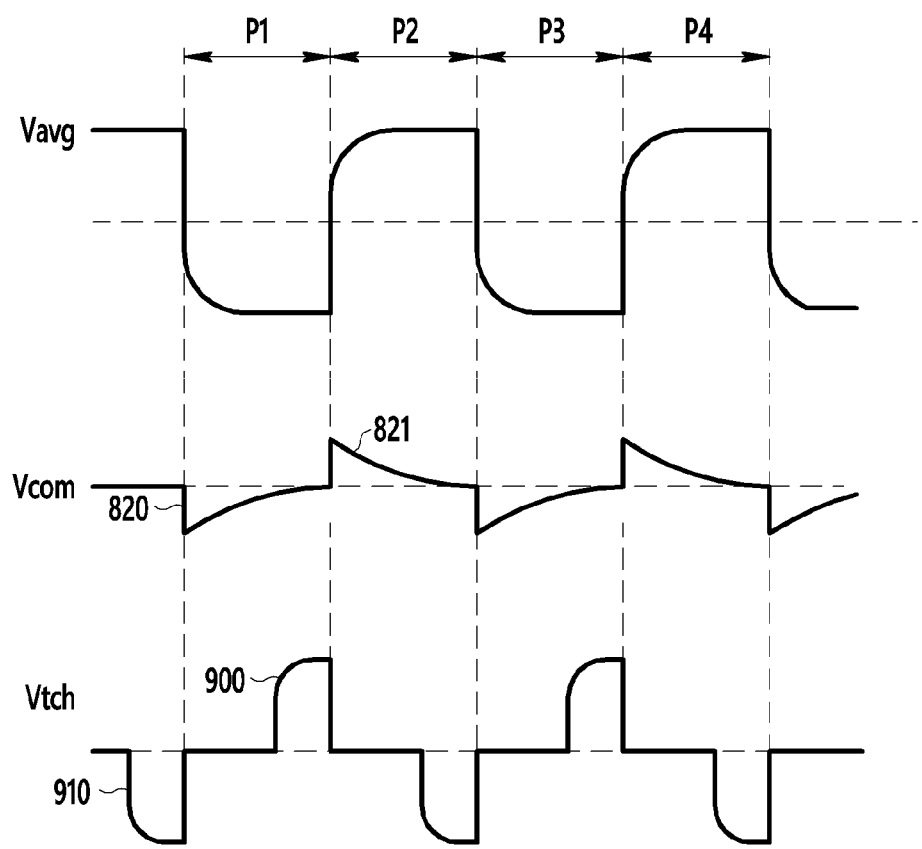

In FIG. 3E, a polarity of the touch driving signal Vtch of FIG. 3D is modified to have alternating polarities for respective periods. The touch controller 200 forms a touch driving signal Vtch by alternately providing the positively polarized pulse 900 and the negatively polarized pulse 910 to the plurality of sensing electrodes 670.

At a starting point of the period P1, the touch driving signal Vtch has a rising edge of the negatively polarized pulse 910. Here, the average display voltage Vavg has a falling edge.

At the same time, a negatively polarized first ripple component and a positively polarized second ripple component are overlapped to form a negatively polarized third ripple component 820. However, as described above, the above embodiment is based on the assumption that the influence of the average display voltage Vavg is greater than the influence of the touch driving signal Vtch. Hereinafter, description of the above will be omitted.

At a starting point of the period P2, the touch driving signal Vtch has a falling edge of the positively polarized pulse 900. Here, the average display voltage Vavg has a rising edge.

At the same time, the first ripple component which is positively polarized and the second ripple component which is negatively polarized overlap to form a third ripple component 821 which is positively polarized.

That is, according to the present exemplary embodiment, the touch controller 200 drives a touch driving signal Vtch to reduce the third ripple components 820 and 821. In other words, the polarity of the touch driving signal Vtch to be driven is determined such that polarities of the first ripple component and the second ripple component that are overlapped are opposite to each other.

A waveform of the common voltage Vcom of the exemplary embodiment of FIG. 3E is similar to that of FIG. 3D, except that a size of the third ripple component 820 which is negatively polarized and a size of the third ripple component 821 which is positively polarized become substantially the same.

Also, the third ripple components 820 and 821 have a smaller average size than the third ripple components 820 and 821 according to the exemplary embodiment of FIG. 3D, and are regularly repeated.

Accordingly, a variation of a distortion amount per unit time is reduced compared to the exemplary embodiment of FIG. 3D, and an average distortion amount converges on 0 so that the common voltage Vcom is closer to an ideal DC voltage.

While this inventive concept has been particularly shown and described with reference to preferred embodiments thereof, the exemplary embodiments should be considered in descriptive sense only and not for purposes of limitation. Thus, it will be understood by those of ordinary skill in the art that various changes may be made therein without departing from the spirit and scope of the inventive concept. Therefore, the scope of the inventive concept is defined by the appended claims.

What is claimed is:

1. A liquid crystal display device comprising:
a plurality of pixel electrodes to which a display voltage is supplied;
a common electrode forming first capacitance with the plurality of pixel electrodes, and having a common voltage supplied thereto;
a plurality of sensing electrodes forming second capacitance with the common electrode, and having a touch driving signal supplied thereto; and
a touch controller supplying the touch driving signal,
wherein a voltage of the common electrode includes a first ripple component that is generated due to variation in the display voltage and a second ripple component that is generated due to variation in the touch driving signal, and,
the touch controller supplies the touch driving signal such that a polarity of the second ripple component is determined based on a polarity of the first ripple component.

2. The liquid crystal display device of claim 1, wherein: the first ripple component and the second ripple component overlap to form a third ripple component.

3. The liquid crystal display device of claim 2, wherein: the touch controller determines a polarity of the touch driving signal in a direction in which a size of each of the third ripple component is reduced.

4. The liquid crystal display device of claim 3, wherein: the first ripple component and the second ripple component have opposite polarities from each other.

5. The liquid crystal display device of claim 2, further comprising:
a data driver supplying a data voltage corresponding to the display voltage,
wherein the touch driving signal from the touch controller synchronizes with the data voltage.

6. The liquid crystal display device of claim 5, wherein: the touch controller receives a synchronization signal from the data driver.

7. The liquid crystal display device of claim 5, further comprising:
a timing controller supplying image data and a first control signal to the data driver and supplying a second control signal to the touch controller,
wherein the second control signal is a synchronization signal corresponding to the supply period of the data voltage.

8. The liquid crystal display device of claim 1, wherein: the touch controller supplies the touch driving signal such that the polarity of the first ripple component and the polarity of the second ripple component adjacent to the first ripple component are the same.

9. The liquid crystal display device of claim 1, wherein: the touch controller receives a touch sensing signal from the plurality of sensing electrode, and the touch sensing signal includes a fourth ripple component according to the second capacitance, and
the touch controller derives the polarity of the first ripple component from a polarity of the fourth ripple component.

10. The liquid crystal display device of claim 1, further comprising:
a data driver supplying a data voltage corresponding to the display voltage;
a timing controller supplying image data and a first control signal to the data driver and supplying a second control signal to the touch controller; and
a pattern detecting unit determining whether an image data pattern corresponds to one of a plurality of correction-target patterns,
wherein if the image data pattern corresponds to one of the plurality of correction-target patterns, the timing controller supplies the second control signal such that the touch controller supplies the touch driving signal corresponding to the correction-target pattern.

11. The liquid crystal display device of claim 10, wherein: the pattern detecting unit is integrally formed with the timing controller.

12. The liquid crystal display device of claim 1, wherein: the second ripple component is generated to correspond to a second edge that follows a first edge in a pulse of the touch driving signal.

13. The liquid crystal display device of claim 1, wherein: the touch driving signal is supplied such that the distortion amount, which is a sum of the first ripple component and the second ripple component, is identical for the each predetermined period.

14. A method of driving a liquid crystal display device, the liquid crystal display device including: a plurality of pixel electrodes, a common electrode forming first capacitance with the plurality of pixel electrodes, and a plurality of sensing electrodes forming second capacitance with the common electrode, the method comprising:
sensing a voltage of the common electrode, including a first ripple component derived from the first capacitance; and
supplying a touch driving signal to the plurality of sensing electrodes such that the voltage of the common electrode includes a second ripple component derived from the second capacitance,
wherein a polarity of the second ripple component is determined based on a polarity of the first ripple component.

15. The method of claim 14, wherein:
the first ripple component and the second ripple component form a third ripple component.

16. The method of claim 15, wherein:
the first ripple component and the second ripple component have opposite polarities from each other.

17. The method of claim 14, wherein:
a touch sensing signal received from the plurality of sensing electrodes includes a fourth ripple component according to the second capacitance, and
the sensing of a voltage of the common electrode further includes deriving a polarity of the first ripple component from a polarity of the fourth ripple component.

18. The method of claim 14, wherein:
in the sensing of the voltage of the common electrode, the voltage of the common electrode is indirectly sensed by determining which one of a plurality of correction-target patterns corresponds to an image data pattern corresponding to a display voltage supplied to the plurality of pixel electrodes.

* * * * *